US011640876B2

(12) United States Patent
Cho et al.

(10) Patent No.: US 11,640,876 B2
(45) Date of Patent: May 2, 2023

(54) ELECTRONIC COMPONENT

(71) Applicant: SAMSUNG ELECTRO-MECHANICS CO., LTD., Suwon-si (KR)

(72) Inventors: Beom Joon Cho, Suwon-si (KR); Min Kyeong Sim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/244,264

(22) Filed: Apr. 29, 2021

(65) Prior Publication Data
US 2022/0139629 A1   May 5, 2022

(30) Foreign Application Priority Data

Nov. 2, 2020   (KR) .................. 10-2020-0144010

(51) Int. Cl.
*H01G 4/30* (2006.01)
*H01G 4/38* (2006.01)
*H01G 4/012* (2006.01)
*H01G 4/12* (2006.01)
*H01G 4/248* (2006.01)

(52) U.S. Cl.
CPC .............. *H01G 4/30* (2013.01); *H01G 4/012* (2013.01); *H01G 4/1227* (2013.01); *H01G 4/248* (2013.01); *H01G 4/38* (2013.01)

(58) Field of Classification Search
CPC ........ H01G 4/30; H01G 4/012; H01G 4/1227; H01G 4/248; H01G 4/38
See application file for complete search history.

(56) References Cited

U.S. PATENT DOCUMENTS

| | | | | |
|---|---|---|---|---|
| 10,403,433 | B2 * | 9/2019 | Choi | H01G 4/232 |
| 2016/0381802 | A1 * | 12/2016 | Taniguchi | H01G 4/232 |
| | | | | 174/260 |
| 2017/0011854 | A1 * | 1/2017 | Son | H01G 4/30 |
| 2018/0350524 | A1 * | 12/2018 | Itamochi | H01G 4/232 |
| 2019/0122823 | A1 * | 4/2019 | Cho | H01G 4/38 |
| 2019/0172651 | A1 * | 6/2019 | Son | H01G 4/30 |
| 2022/0139629 | A1 * | 5/2022 | Cho | H01G 4/30 |
| | | | | 361/301.4 |

FOREIGN PATENT DOCUMENTS

| | | | | |
|---|---|---|---|---|
| JP | 2012-43947 | A | 3/2012 | |
| JP | 6855688 | B2 * | 4/2021 | ............... B41C 1/18 |
| KR | 10-1031111 | B1 | 4/2011 | |
| KR | 20140075876 | A * | 6/2014 | |
| KR | 20200042860 | A * | 4/2020 | |

* cited by examiner

Primary Examiner — Dion R. Ferguson
(74) Attorney, Agent, or Firm — Morgan, Lewis & Bockius LLP

(57) ABSTRACT

An electronic component includes at least one first multilayer capacitor and at least one second multilayer capacitor alternatively laminated in a first direction perpendicular to one surface of the first multilayer capacitor, such that an external electrode of the first multilayer capacitor is connected to an external electrode of the second multilayer capacitor. In the first multilayer capacitor, a plurality of internal electrodes are laminated in a first direction, and in the second multilayer capacitor, a plurality of internal electrodes are laminated in a second direction perpendicular to the first direction.

18 Claims, 13 Drawing Sheets

ELECTRONIC COMPONENT

CROSS-REFERENCE TO RELATED APPLICATION(S)

This application claims benefit of priority to Korean Patent Application No. 10-2020-0144010 filed on Nov. 2, 2020 in the Korean Intellectual Property Office, the disclosure of which is incorporated herein by reference in its entirety.

TECHNICAL FIELD

The present disclosure relates to an electronic component.

BACKGROUND

A multilayer capacitor has been used in various electronic devices as such a multilayer capacitor may be small-sized and implemented with high capacity.

Recently, as eco-friendly vehicles and electric vehicles have been rapidly developed, a power driving system has been increasingly used in a vehicle, and accordingly, demand for a multilayer capacitor required for a vehicle has also been increased.

As components for vehicles need to have high level of thermal or electrical reliability, required performance of a multilayer capacitor has been advanced. In particular, as mounting density of components increases, a multi-chip stack capacitor which may increase mounting density in a limited space and may implement high capacity or a capacitor having improved durability against vibrations and deformation may be necessary.

A multilayer capacitor may be formed of a dielectric material, and since a dielectric material has piezoelectric properties, the material may be synchronized with an applied voltage and may be deformed accordingly.

When a period of the applied voltage is in an audible frequency range, the displacement may become vibrations and may be transmitted to a board through solders, and the vibrations of the board may be heard as a sound. This sound is known as acoustic noise.

Apart from acoustic noise perceived by human ears, when piezoelectric vibrations of the multilayer capacitor occur in a high frequency region of 20 kHz or higher, the vibrations may cause malfunctioning of various sensors used in the fields of IT and industrial/vehicle components.

Recently, as multilayer capacitors have been increasingly used in vehicles, there has been increasing demand for reducing vibration noise generated from a multilayer capacitor.

SUMMARY

An aspect of the present disclosure is to provide an electronic component which may reduce acoustic noise in an audible frequency range of less than 20 kHz and high frequency vibration of 20 kHz or higher.

According to an aspect of the present disclosure, an electronic component includes at least one first multilayer capacitor and at least one second multilayer capacitor alternatively laminated in a first direction perpendicular to one surface of the first multilayer capacitor, such that an external electrode of the first multilayer capacitor is connected to an external electrode of the second multilayer capacitor. In the first multilayer capacitor, a plurality of internal electrodes are laminated in a first direction, and in the second multilayer capacitor, a plurality of internal electrodes are laminated in a second direction perpendicular to the first direction.

The first multilayer capacitor may be disposed on a lowermost end in the first direction.

The second multilayer capacitor may be disposed on a lowermost end in the first direction.

The electronic component may further include a conductive adhesive layer disposed between the external electrode of the first multilayer capacitor and the external electrode of the second multilayer capacitor.

The first multilayer capacitor may include a first body and first and second external electrodes disposed on both ends of the first body in a third direction perpendicular to the second direction, respectively, the first body may include a plurality of first dielectric layers and first and second internal electrodes alternately disposed in the first direction with the first dielectric layer interposed therebetween, the second multilayer capacitor may include a second body and third and fourth external electrodes disposed on both ends of the second body in the third direction, respectively, and the second body may include a plurality of second dielectric layers and third and fourth internal electrodes alternately disposed in the second direction with the second dielectric layer interposed therebetween.

The first and second external electrodes may include first and second head portions disposed on both end surfaces of the first body in the third direction, respectively; and first and second band portions extending from the first and second head portions to portions of upper and lower surfaces and portions of both side surfaces of the first body, respectively, and the third and fourth external electrodes may include third and fourth head portions disposed on both end surfaces of the second body in the third direction, respectively; and third and fourth band portions extending from the third and fourth head portions to portions of upper and lower surfaces of the second body and portions of both side surfaces of the second body, respectively.

The electronic component may further include a metal frame connected to the external electrode of the first multilayer capacitor and the external electrode of the second multilayer capacitor and allowing the first or second multilayer capacitor to be spaced apart from a mounting surface.

The electronic component may further include a first metal frame including a first vertical portion bonded to the first and third head portions, and a first mounting portion extending in a third direction from a lower end of the first vertical portion, and a second metal frame including a second vertical portion bonded to the second and fourth head portions, and a second mounting portion extending in the third direction from a lower end of the second vertical portion.

The first mounting portion and the second mounting portion may be spaced apart from the first multilayer capacitor and the second multilayer capacitor.

According to another aspect of the present disclosure, an electronic component includes first and second multilayer capacitors laminated side by side with each other in a first direction perpendicular to one surface of the first multilayer capacitor, wherein the first multilayer capacitor includes first and second internal electrodes alternately laminated in the first direction, and first and second external electrodes disposed on both ends to be connected to the first and second internal electrodes, respectively, wherein the second multilayer capacitor includes third and fourth internal electrodes alternately laminated in a second direction perpendicular to the first direction, and third and fourth external electrodes disposed on both ends to be connected to the third and fourth internal electrodes, respectively, and wherein the first external electrode is connected to the third external electrode, and the second external electrode is connected to the fourth external electrode.

The first multilayer capacitor may be disposed adjacent to a mounting surface.

The second multilayer capacitor may be disposed adjacent to a mounting surface.

According to another aspect of the present disclosure, an electronic component includes a plurality of multilayer capacitors stacked on each other in a first direction and including a first multilayer capacitor and a second multilayer capacitor. Internal electrodes of the first multilayer capacitor are laminated in the first direction, and internal electrodes of the second multilayer capacitor are laminated in a second direction different from the first direction.

First and second external electrodes of the first multilayer capacitor may be respectively connected to third and fourth external electrodes of the second multilayer capacitor.

The electronic component may further include: a first conductive adhesive layer disposed between the first external electrode and the third external electrode; and a second conductive adhesive layer disposed between the second external electrode and the fourth external electrode.

The electronic component further include: a first metal frame including a first vertical portion connected to the first external electrode and the third external electrode, and a first mounting portion bent from the first vertical portion; and a second metal frame including a second vertical portion connected to the second external electrode and the fourth external electrode, and a second mounting portion bent from the second vertical portion.

The first mounting portion and the second mounting portion may be spaced apart from the first multilayer capacitor and the second multilayer capacitor.

The second multilayer capacitor may be closer to the first mounting portion and the second mounting portion than the first multilayer capacitor.

The first multilayer capacitor may be closer to the first mounting portion and the second mounting portion than the second multilayer capacitor.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
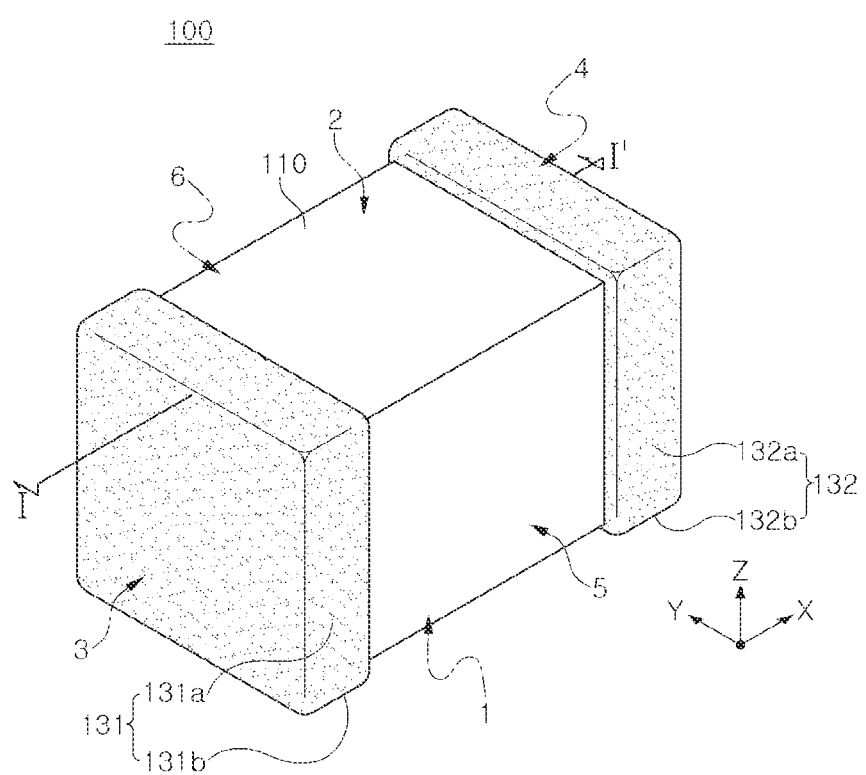
FIG. 1 is a perspective diagram illustrating a first multilayer capacitor having a horizontal laminate structure according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it may further include another element, not excluding another element, unless otherwise indicated.

As for the directions of the hexahedron, in the drawings, X, Y, and Z indicated on the drawings represent a length direction, a width direction, and a thickness direction of the capacitor body, respectively.

The Z direction may be a first direction, the Y direction may be a second direction, and the X direction may be a third direction. In one example, the X direction, the Y direction, and the Z direction may be based on a coordinate system shown in one of FIGS. 7-10.

Figure 2A:
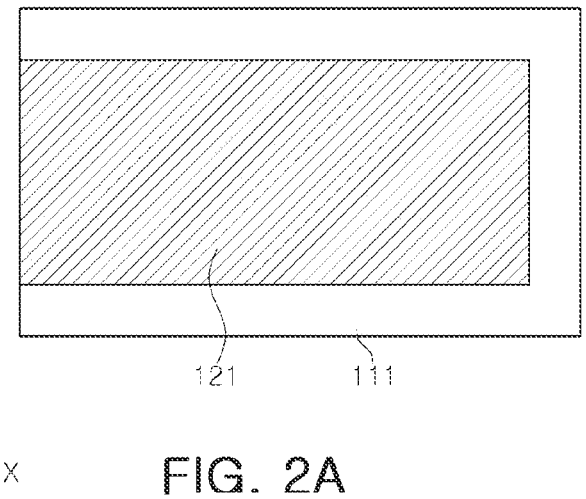
FIGS. 2A and 2B are plan diagrams illustrating first and second internal electrodes applied to the first multilayer capacitor illustrated in FIG. 1.
Figure 2B:
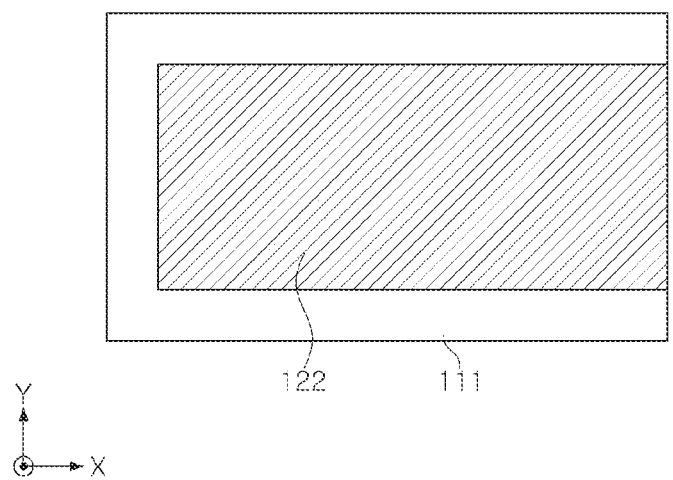
Figure 3:
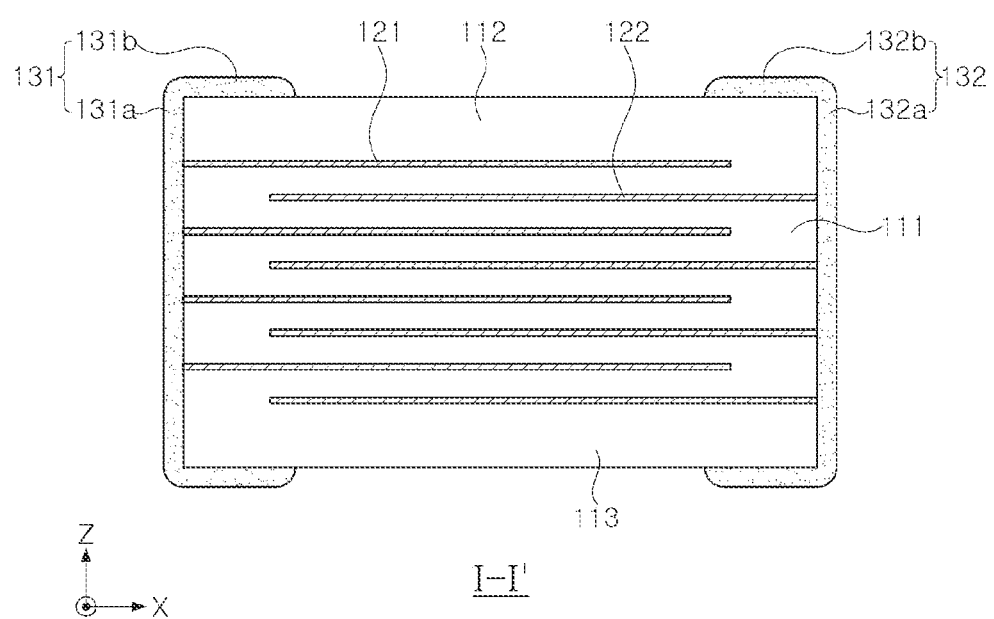
FIG. 3 is a cross-sectional diagram taken along line I-I' in FIG. 1.

FIG. 1 is a perspective diagram illustrating a first multilayer capacitor having a horizontal laminate structure according to an example embodiment. FIGS. 2A and 2B are plan diagrams illustrating first and second internal electrodes applied to the first multilayer capacitor illustrated in FIG. 1. FIG. 3 is a cross-sectional diagram taken along line I-I' in FIG. 1.

A structure of the first multilayer capacitor applied to the electronic component in the example embodiment will be described with reference to FIGS. 1 to 3.

Referring to FIGS. 1 to 3, the first multilayer capacitor 100 in the example embodiment may include a first body 110 and first second external electrodes 131 and 132 disposed on both ends of the first body 110 taken in the X direction, respectively.

The first body 110 may be obtained by laminating a plurality of dielectric layers 111 in the Z direction and sintering the dielectric layers, and boundaries between the dielectric layers 111 of the first body 110 adjacent to each other may be integrated such that it may be difficult to identify the boundaries without using a scanning electron microscope (SEM).

The first body 110 may include a plurality of first dielectric layers 111 and first and second internal electrodes 121 and 122 having different polarities and alternately disposed in the Z direction with the first dielectric layer 111 interposed therebetween.

The first body 110 may include an active region contributing to the formation of capacitance of the capacitor, and cover regions 112 and 113 disposed above and below the active region in the Z direction as margin portions.

The first body 110 may have a substantially hexahedral shape, but an example embodiment thereof is not limited thereto. The first body 110 may include first and second surfaces 1 and 2 opposing each other in the Z direction, third and fourth surfaces 3 and 4 and opposing each other in the X direction and connected to the first and second surfaces 1 and 2, and fifth and sixth surfaces 5 and 6 opposing each other in the Y direction and connected to the first and second surfaces 1 and 2 and the third and fourth surfaces 3 and 4.

The first dielectric layers 111 may include ceramic powder, $BaTiO_3$ ceramic powder, for example.

$BaTiO_3$ ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which Ca or Zr is partially solid-solute in BaTiO3, and the like, and the ceramic powder in the example embodiment is not limited thereto.

The first dielectric layers 111 may further include ceramic additives, organic solvents, plasticizers, binders, and dispersants in addition to ceramic powder.

The ceramic additives may include a transition metal oxide or a transition metal carbide, a rare earth element, magnesium (Mg) or aluminum (Al).

The first multilayer capacitor 100 in the example embodiment may have a horizontal lamination structure, and the first and second internal electrodes 121 and 122 may be applied with different polarities, may be disposed on the first dielectric layer 111 and may be laminated in the Z direction. The first and second internal electrodes 121 and 122 may be alternately disposed in the first body 110 in the Z direction with the first dielectric layer 111 interposed therebetween.

In this case, the first and second internal electrodes 121 and 122 may be electrically insulated from each other by the first dielectric layer 111 disposed therebetween.

One ends of the first and second internal electrodes 121 and 122 may be exposed through the third and fourth surfaces 3 and 4 of the first body 110, respectively.

The ends of the first and second internal electrodes 121 and 122 alternately exposed through the third and fourth surfaces 3 and 4 of the first body 110 may be electrically connected to the first and second external electrodes 131 and 132 disposed on both ends of the first body 110 taken in the X direction.

Accordingly, when a predetermined voltage is applied to the first and second external electrodes 131 and 132, electrical charges may be accumulated between the first and second internal electrodes 121 and 122.

In this case, capacitance of the first multilayer capacitor 100 may be proportional to an area of overlap between the first and second internal electrodes 121 and 122 overlapping each other in the Z direction in the active region.

A material for forming the first and second internal electrodes 121, 122 is not limited to any particular material. For example, the first and second internal electrodes 121 and 122 may be formed using a conductive paste formed of at least one of a noble metal material such as platinum (Pt), palladium (Pd), palladium-silver (Pd—Ag) alloy, and nickel (Ni), and copper (Cu).

As a method of printing the conductive paste, a screen-printing method or a gravure printing method may be used, but an example embodiment thereof is not limited thereto.

The first and second external electrodes 131 and 132 may be provided with voltages of different polarities, may be disposed on both ends of the body 110 in the X direction, and may be electrically connected to the exposed ends of the first and second internal electrodes 121 and 122, respectively.

The first external electrode 131 may include a first head portion 131a and a first band portion 131b.

The first head 131a may be disposed on the third surface 3 of the first body 110, and may be in contact with the end of the first internal electrode 121 exposed through the third surface 3 of the first body 110, and may electrically connect the first internal electrode 121 to the first external electrode 131.

The first band portion 131b may extend from the first head portion 131a to a portion of the first, second, fifth and sixth surfaces 1, 2, 5, and 6 of the capacitor body 110 to improve adhesion strength.

The second external electrode 132 may include a second head portion 132a and a second band portion 132b.

The second head 132a may be disposed on the fourth surface 4 of the first body 110, and may be in contact with an end of the second internal electrode 122 exposed through the fourth surface 4 of the first body 110, and may electrically connect the second internal electrode 122 to the second external electrode 132.

The second band portion 132b may extend from the second head portion 132a to a portion of the first, second, fifth and sixth surfaces 1, 2, 5, and 6 of the capacitor body 110 to improve adhesion strength.

The first and second external electrodes 131 and 132 may further include plating layers.

The plating layers may include first and second nickel (Ni) plating layers covering surfaces of the first and second external electrodes 131 and 132, respectively, and first and second tin (Sn) plating layers covering the first and second nickel plating layers, respectively.

Figure 4:
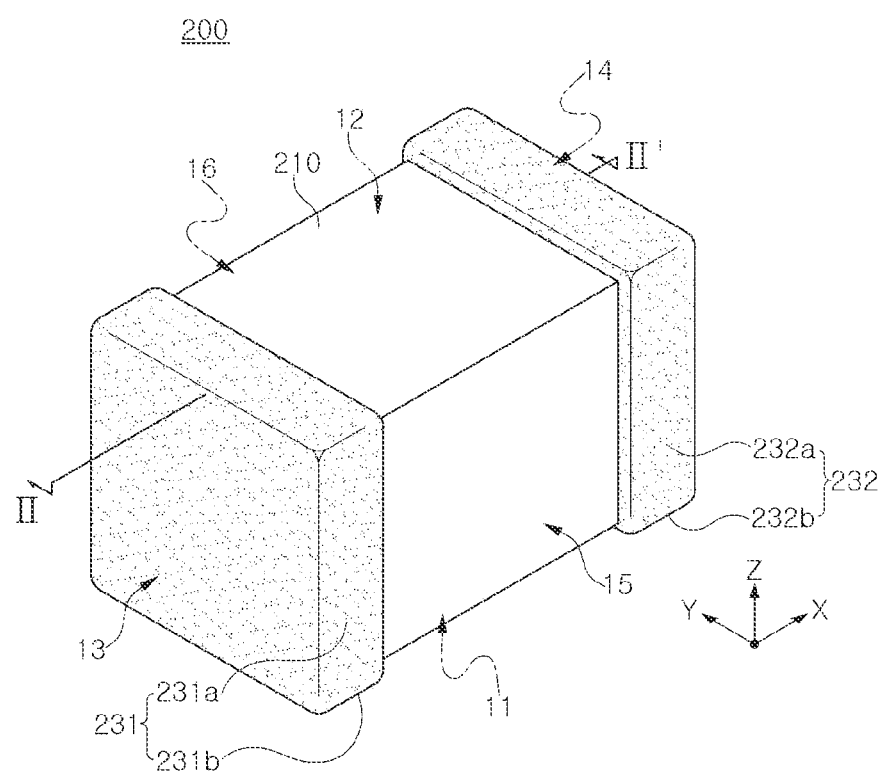
FIG. 4 is a perspective diagram illustrating a second multilayer capacitor having a vertical laminate structure according to an example embodiment of the present disclosure.
Figure 5A:
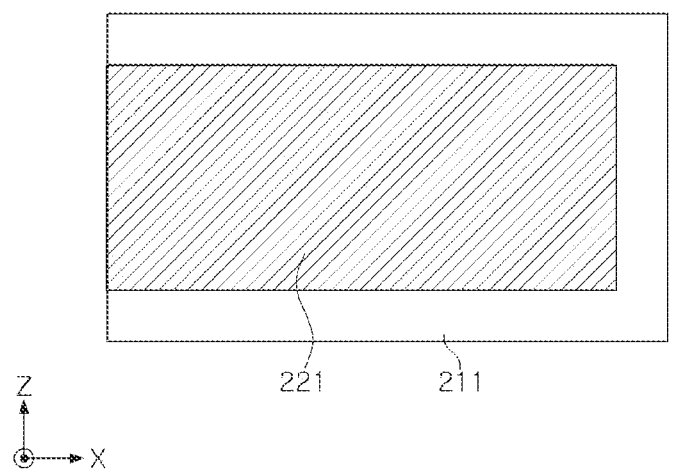
FIGS. 5A and 5B are plan diagrams illustrating third and fourth internal electrodes applied to the second multilayer capacitor illustrated in FIG. 4.
Figure 5B:
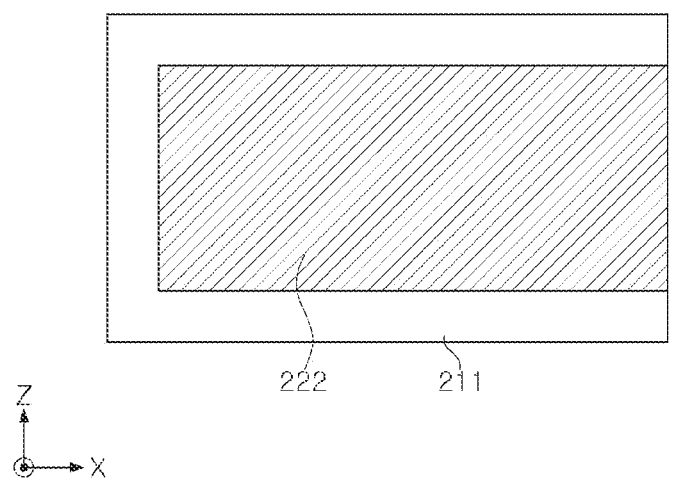
Figure 6:
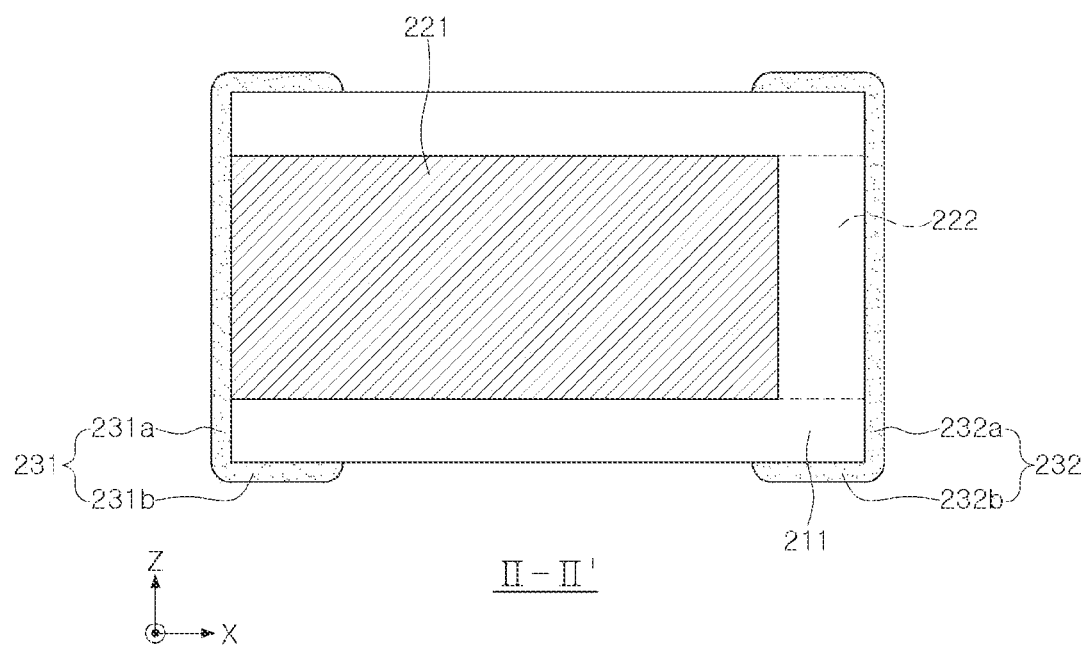
FIG. 6 is a cross-sectional diagram taken along line II-II' in FIG. 4.

FIG. 4 is a perspective diagram illustrating a second multilayer capacitor having a vertical laminate structure according to an example embodiment. FIGS. 5A and 5B are plan diagrams illustrating third and fourth internal electrodes applied to the second multilayer capacitor illustrated in FIG. 4. FIG. 6 is a cross-sectional diagram taken along line II-II' in FIG. 4.

The configurations similar to the structure of the first multilayer capacitor described above, such as the structure in which the third and fourth external electrodes 231 and 232 are formed, will not be described in detail to avoid overlap, and third and fourth internal electrodes 221 and 222 having structures different from the aforementioned example embodiment will be described in detail.

Referring to FIGS. 4 to 6, in the second multilayer capacitor 200 having a vertical lamination structure in the example embodiment, the second body 210 may include a plurality of second dielectric layers 211 and third and fourth internal electrodes 221 and 222 having different polarities and alternately disposed in the Y direction with the second dielectric layer 211 therebetween.

The second body 210 may have a substantially hexahedral shape, but an example embodiment thereof is not limited thereto. The second body 210 may include 1-1 and 2-1 surfaces 11 and 12 opposing each other in the Z direction, 3-1 and 4-1 surfaces 13 and 14 connected to the 1-1 and 2-1 surfaces 11 and 12 and opposing each other in the X direction, and 5-1 and 6-1 surfaces 15 and 16 connected to the 1-1 and 2-1 surfaces 11 and 12 and the 3-1 and 4-1 surfaces 13 and 14 and opposing each other in the Y direction. The 1-1 surface 11 may be configured as a mounting surface.

The third and fourth internal electrodes 221 and 222 may be applied with different polarities, and may be formed on the second dielectric layer 211 and may be laminated in the Y direction, and the third and fourth internal electrodes 221 and 222 may be alternately disposed in the second body 210 in the Y direction with the second dielectric layer 211 interposed therebetween to oppose each other.

The third external electrode 231 may include a third head portion 231a connected to the third internal electrode 221, and a third band portion 231b extending from the third head portion 231a to a portion of the 2-1, 5-1, and 6-1 surfaces 12, 15, and 16 of the second body 210.

The fourth external electrode 232 may include a fourth head portion 232a connected to the fourth internal electrode 222 and a fourth band portion 232b extending from the fourth head portion 232a to a portion of the 2-1, 5-1, and 6-1 surfaces 12, 15, and 16 of the second body 210.

In the electronic component in the example embodiment, at least one first multilayer capacitor 100 and at least one second multilayer capacitor 200 may be alternately laminated in a direction perpendicular to one surface of the first multilayer capacitor 100. In one example, element A being perpendicular to element B may mean that element A is perfect perpendicular to element B, or may mean that element A is substantially perpendicular to element B in consideration of in consideration of an error, margin, or tolerance, which may occur in measurement or in manufacturing, appreciated by one of ordinary skill in the art. Here, element A or element B may refer to a structure, a plane, a surface, a line, a direction, or the like.

One surfaces of the first multilayer capacitor 100 and 200 may be a surface opposing the board when the electronic component in the example embodiment is mounted on the board, and may be the first surface 1 of the first multilayer capacitor 100, for example.

In this case, in the first multilayer capacitor 100, the first and second internal electrodes 121 and 122 may be laminated in the Z direction, a first direction perpendicular to one surface, and in the second multilayer capacitor 200, the third and fourth internal electrodes 221 and 222 may be laminated in the Y direction, a second direction perpendicular to the first direction.

Figure 7:
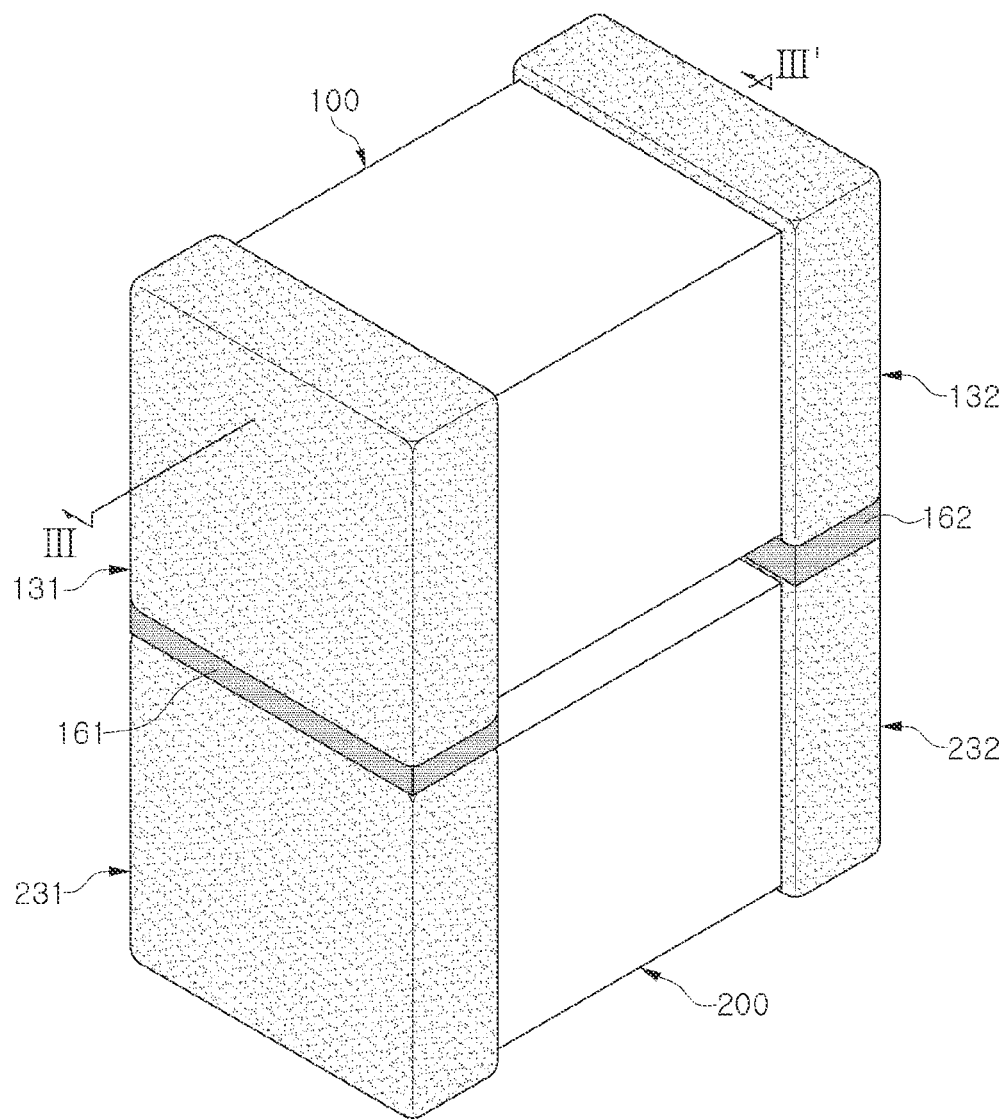
FIG. 7 is a perspective diagram illustrating a structure of an electronic component according to an example embodiment of the present disclosure.
Figure 8:
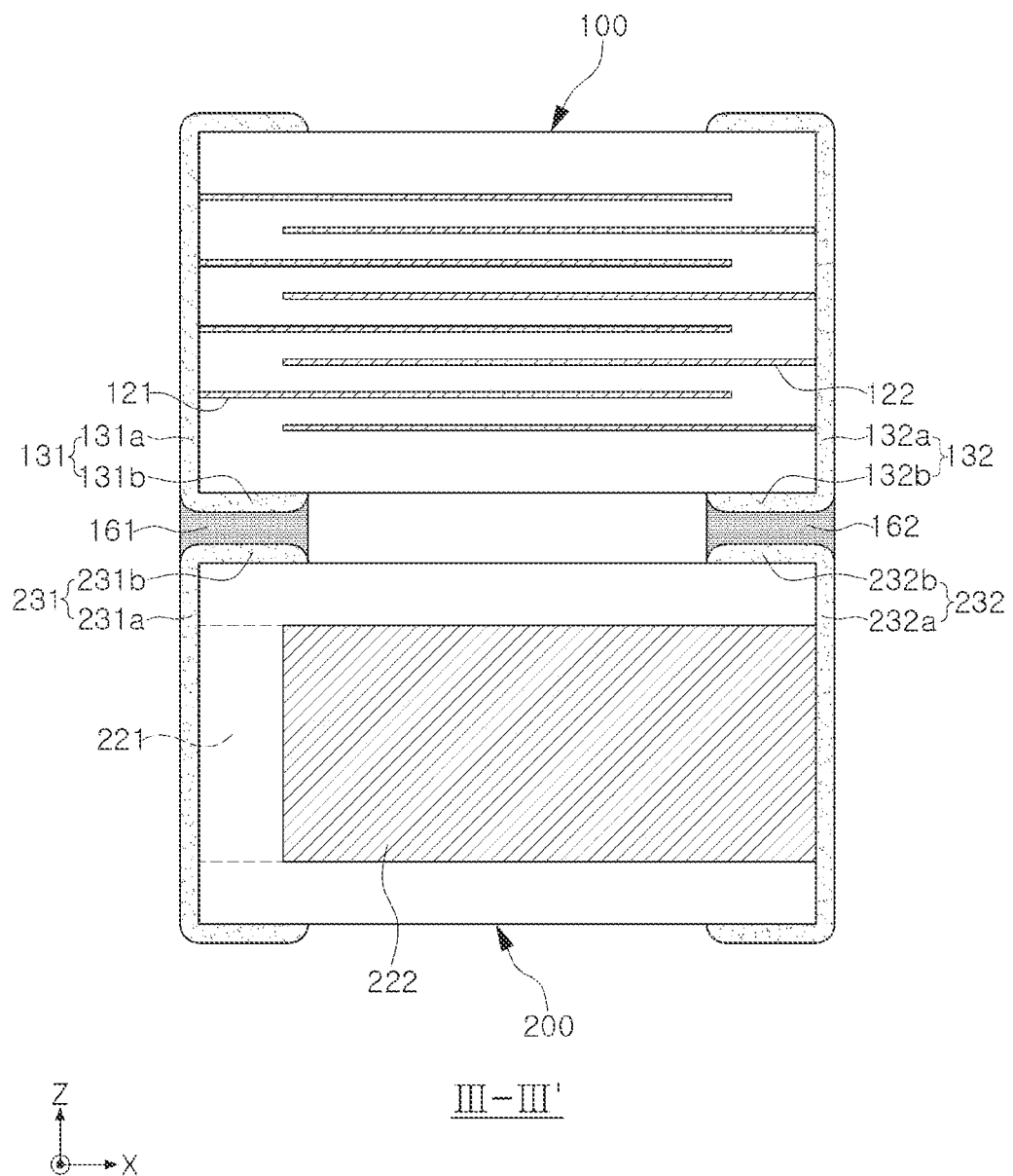
FIG. 8 is a cross-sectional diagram taken along line III-III' in FIG. 7.

FIG. 7 is a perspective diagram illustrating a structure of an electronic component according to an example embodiment. FIG. 8 is a cross-sectional diagram taken along line III-III' in FIG. 7.

Referring to FIGS. 7 and 8, the electronic component in the example embodiment may include one first multilayer capacitor 100 and one second multilayer capacitor 200.

In this case, the first multilayer capacitor 100 and the second multilayer capacitor 200 may be arranged linearly in the Z direction.

In the example embodiment, the second multilayer capacitor 200 may be disposed in a lower region in the Z direction in the drawing, and the first multilayer capacitor 100 may be disposed side by side with the second multilayer capacitor 200 above the second multilayer capacitor 200 in the Z direction.

In this case, a first conductive adhesive layer 161 may be disposed between the lower first band portion 131b of the first external electrode 131 of the first multilayer capacitor 100 and the upper third band portion 231b of the third external electrode 231 of the second multilayer capacitor 200.

Also, a second conductive adhesive layer 162 may be disposed between the lower second band portion 132b of the second external electrode 132 of the first multilayer capacitor 100 and the upper fourth band portion 232b of the fourth external electrode 232 of the second multilayer capacitor 200.

The first and second conductive adhesive layers 161 and 162 may allow the first multilayer capacitor 100 and the second multilayer capacitor 200 to be electrically connected to each other and not to be separated from each other.

Generally, when an electric field is applied to a multilayer capacitor, a dielectric material may expand in a direction in which the electric field is applied, and may be simultaneously reduced in a direction perpendicular to the electric field due to the Poisson effect.

In this case, the mounting portion of the board in contact with the multilayer capacitor may be pulled toward the center of the multilayer capacitor and may be twisted in a direction perpendicular to a surface of the board. When the electric field is removed, the board may return to an original state thereof.

When the above process is repeated according to amplitude of an alternating current voltage, the board may vibrate, and when the amplitude and frequency is within an audible range for human, the vibrations may be recognized as vibration noise.

In the case of a general electronic component having a stack structure, the laminating directions of internal electrodes of the multilayer capacitors disposed in a vertical direction may be the same such that the directions in which the multilayer capacitor on the lower side and the multilayer capacitor on the upper side deform may also be the same.

Therefore, the vibrations of the multilayer capacitor on the lower side and the vibrations of the multilayer capacitor on the upper side may collide with each other while the capacitors expand upwardly and downwardly in the Z direction, and the capacitors may be reduced inwardly in the X-Y direction, such that the board may be pulled by doubled strength. Accordingly, the vibrations of the board caused by the deformation of the multilayer capacitors may be doubled.

Differently from the above example, in the electronic component in the example embodiment, a plurality of first and second multilayer capacitors may be bonded to each other in a stack structure formed in the Z direction, and in this case, the laminating direction of the internal electrodes of the first multilayer capacitor may be perpendicular to the laminating direction of the internal electrodes of the second multilayer capacitor.

Accordingly, the second multilayer capacitor disposed on the lower side may generate vibrations reduced inwardly in the Z direction, and the first multilayer capacitor disposed on the upper side may generate vibrations expanding outwardly in the Z direction.

Therefore, vibrations generated by the first and second multilayer capacitors in the Z direction may not collide with each other, and when one of the multilayer capacitor is reduced in the X-Y direction, the opposite multilayer capacitor may expand in an opposite direction such that force applied to the board may be reduced.

The electronic component in the example embodiment may be modified to have various arrangement structures.

Figure 9:
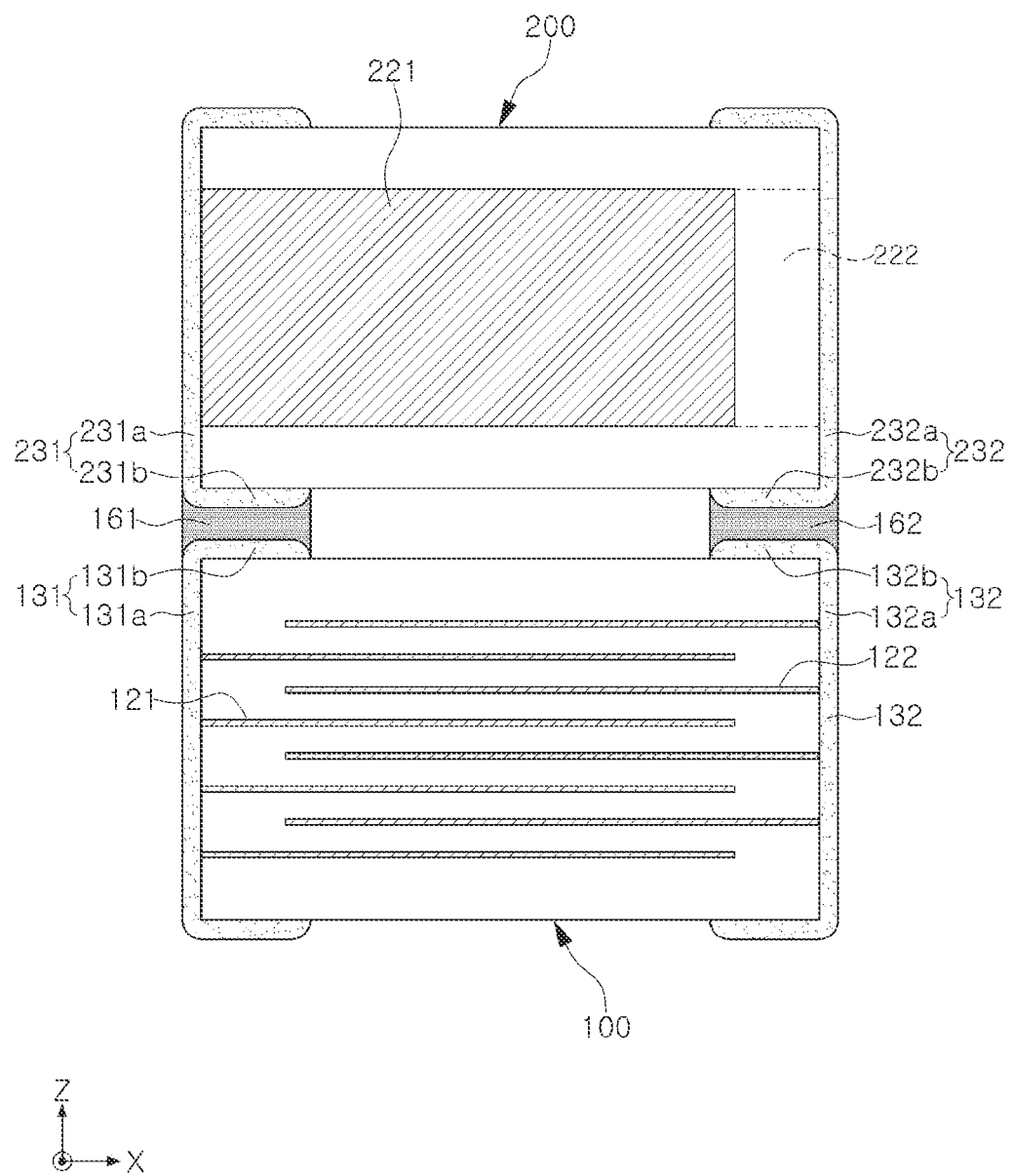
FIG. 9 is a cross-sectional diagram illustrating a structure of an electronic component according to another example embodiment of the present disclosure.

For example, as illustrated in FIG. 9, a first multilayer capacitor 100 may be disposed on a lower side in the Z direction, and a second multilayer capacitor 200 may be disposed side by side with the first multilayer capacitor 100 above the first multilayer capacitor 100.

Even in this case, as in the aforementioned embodiment, there may be no collision between vibrations generated by the two multilayer capacitors in the Z direction, and one of the multilayer capacitors may be reduced and the other multilayer capacitor may expand in the X-Y direction such that force applied to the board may be reduced.

Figure 13:
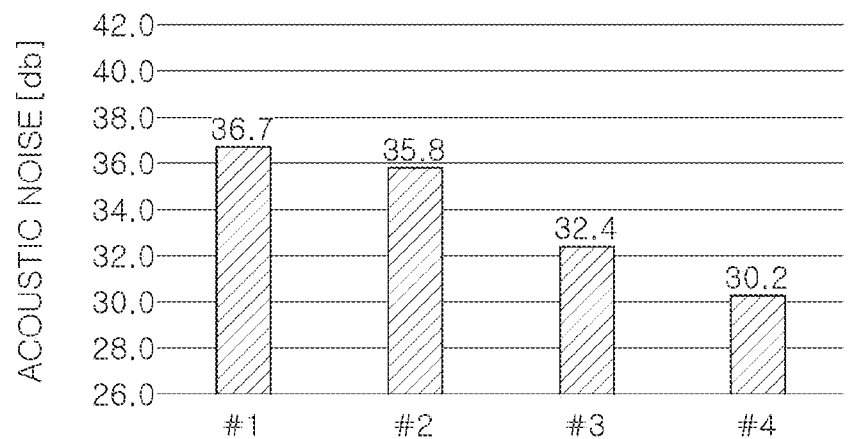
FIG. 13 is a graph illustrating how vibration noise changes in a laminating direction when two multilayer capacitors are laminated in a Z direction.

FIG. 13 is a graph illustrating how vibration noise changes in a laminating direction when two multilayer capacitors are laminated in a Z direction. Five samples were measured, and an average value was obtained.

The first multilayer capacitor and the second multilayer capacitor may have a length and a width of 3.2 mm and 2.5 mm, respectively, and the total number of laminated internal electrodes may be 266 in each of the capacitors.

1 and #2 are comparative examples, and #1 is a sample in which first multilayer capacitors were disposed on upper and lower sides, #2 is a sample in which second multilayer capacitors were disposed on upper and lower sides, #3 is a sample in which an electronic component had the structure illustrated in FIG. 9, and #4 is a sample in which an electronic component had the structure illustrated in FIG. 7.

Referring to FIG. 13, in #1, the acoustic noise was 36.7 dB, the highest, and in #2, the acoustic noise was 35.8 dB, lower than #1 but still high.

In #3 and #4 according to the example embodiment, it is indicated that the acoustic noise was 32.4 dB and 30.2 dB, respectively, and acoustic noise was lowered further than in #1 and #2.

In particular, in this structure without a metal frame, since the vibrations of the multilayer capacitor may be directly transmitted to the board, the least acoustic noise was observed in #4 in which the second multilayer capacitor having a vertical lamination structure is disposed on the mounting surface side.

Figure 10:
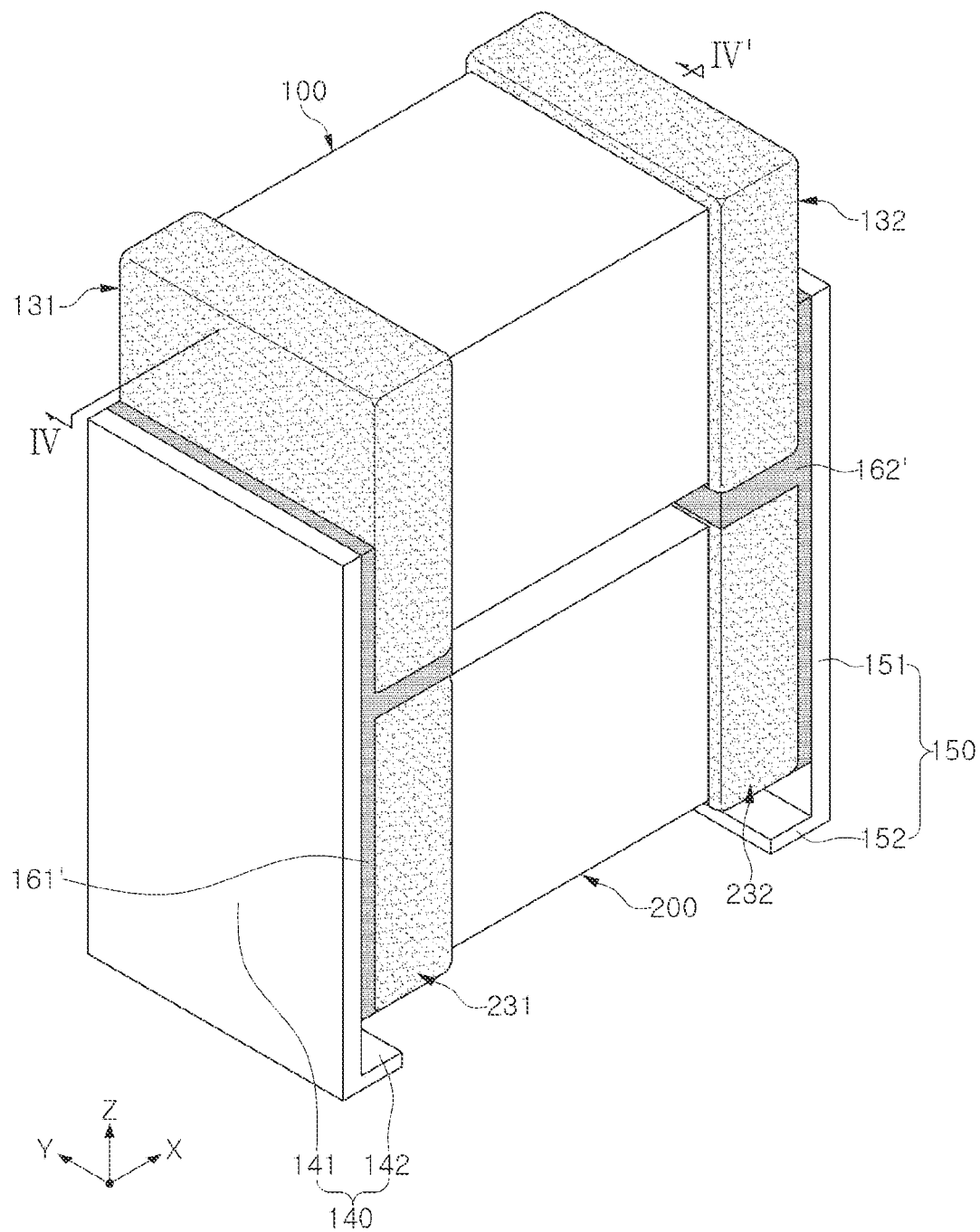
FIG. 10 is a perspective diagram illustrating a structure of an electronic component according to another example embodiment of the present disclosure.
Figure 11:
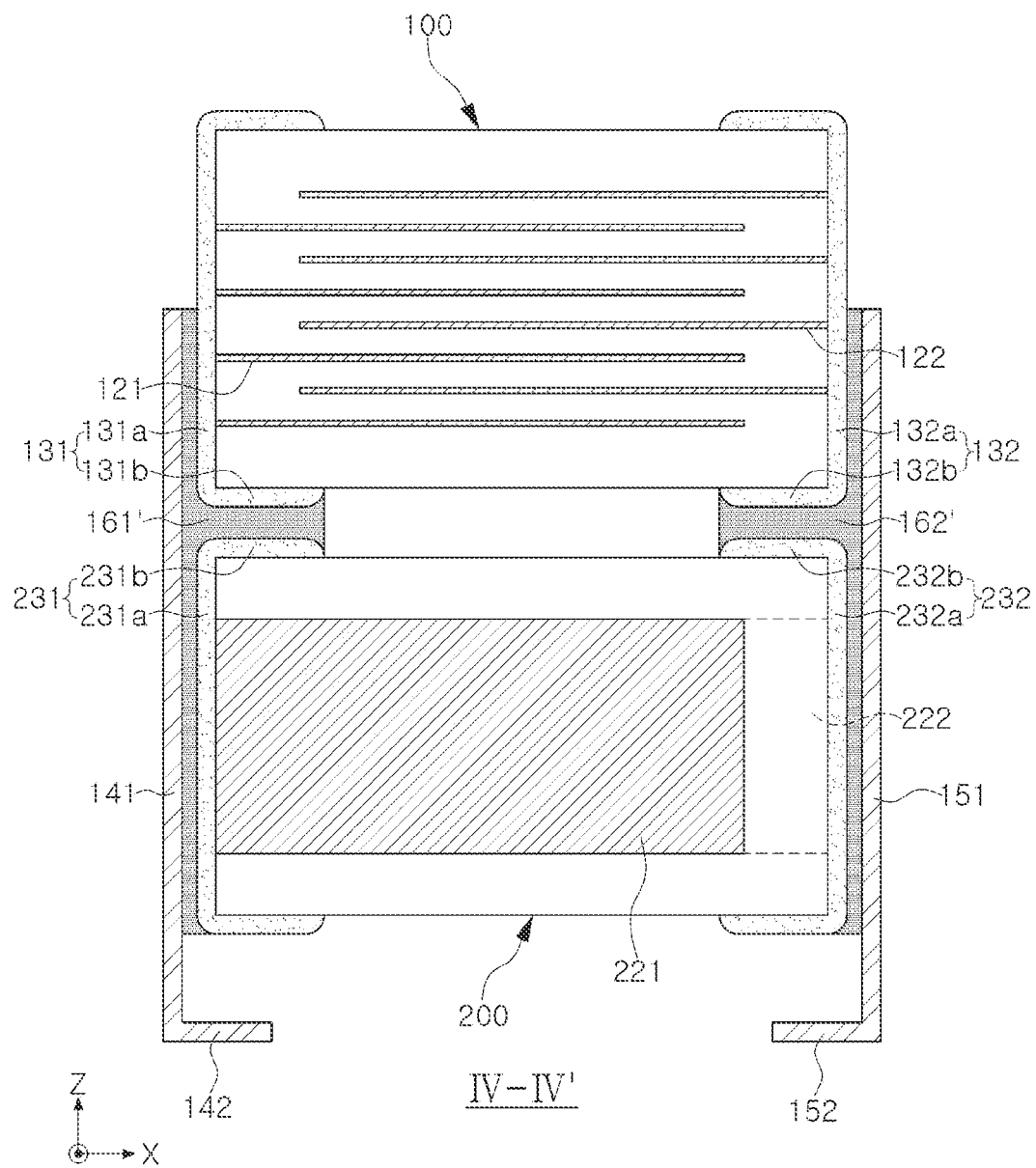
FIG. 11 is a cross-sectional diagram taken along line IV-IV' in FIG. 10.

FIG. 10 is a perspective diagram illustrating a structure of an electronic component according to another example embodiment. FIG. 11 is a cross-sectional diagram taken along line IV-IV' in FIG. 10.

Referring to FIGS. 10 and 11, the electronic component in the example embodiment may include a metal frame connected to an external electrode. The metal frame may include first and second metal frames 140 and 150.

The first metal frame 140 may include a first vertical portion 141 bonded to first and third head portions 131a and 231a, and a first mounting portion 142 extending in the X direction from a lower end of the first vertical portion 141.

The second metal frame 150 may include a second vertical portion 151 bonded to the second and fourth head portions 132a and 232a, and a second mounting unit 152 extending in the X direction from a lower end of the second vertical portion 151.

In this case, the first conductive adhesive layer 161' may be further disposed between the first head portion 131a and the first vertical portion 141, and between the third head portion 231a and the first vertical portion 141.

Also, the second conductive adhesive layer 162' may be further disposed between the second head portion 132a and the second vertical portion 151, and between the fourth head portion 232a and the second vertical portion 151.

In the example embodiment, the second multilayer capacitor 200 may be disposed on the lower side in the Z direction in the drawing, and the first multilayer capacitor 100 may be disposed side by side with the second multilayer capacitor 200 above the second multilayer capacitor 200.

The electronic component in the example embodiment may be modified to have various arrangement structures.

Figure 12:
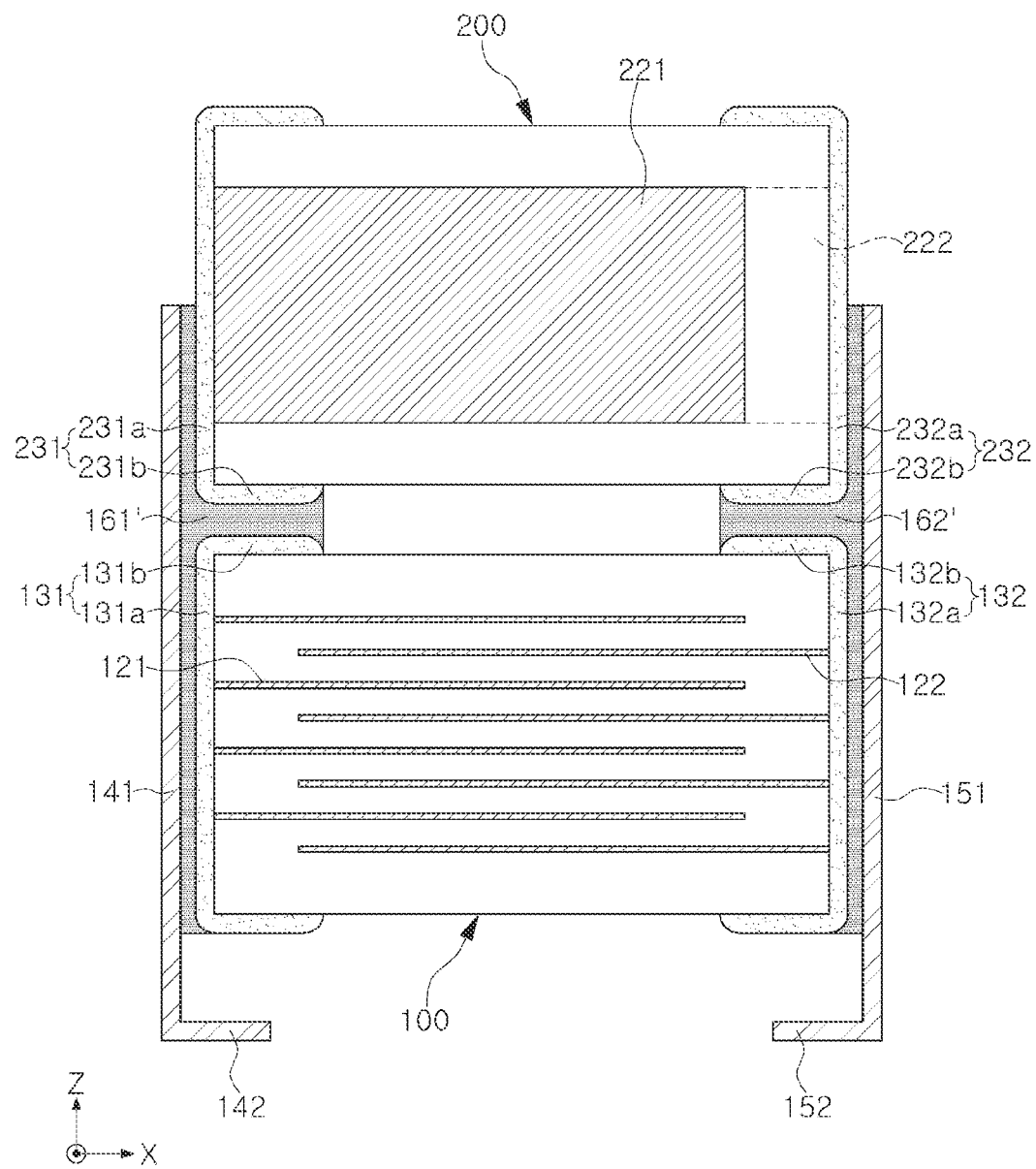
FIG. 12 is a cross-sectional diagram illustrating a structure of an electronic component according to another example embodiment of the present disclosure.

For example, as illustrated in FIG. 12, a first multilayer capacitor 100 may be disposed on the lower side in the Z direction, and a second multilayer capacitor 200 may be disposed side by side with the first multilayer capacitor 100 above the first multilayer capacitor 100.

In the example embodiment, by bonding the metal frame to both end surfaces of the first and second multilayer capacitors, a spacing between the multilayer capacitors disposed on the lower end and the board may be secured when being mounted on the board, such that stress from the board may not be directly transmitted to the multilayer capacitors, and also the vibrations of the multilayer capacitors may not be transmitted to the board, thereby reducing acoustic noise.

Figure 14:
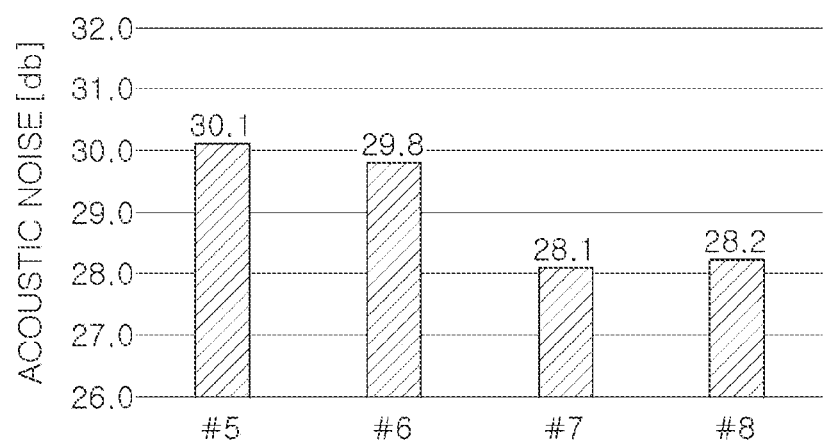
FIG. 14 is a graph illustrating how vibration noise changes in a laminating direction when two multilayer capacitors are laminated in the Z direction and a metal frame is attached thereto.

FIG. 14 is a graph illustrating how vibration noise changes in a laminating direction when two multilayer capacitors are laminated in the Z direction and a metal frame is attached thereto. Five samples were measured, and an average value was obtained.

The first multilayer capacitor and the second multilayer capacitor had a length and a width of 3.2 mm and 2.5 mm, respectively, and the total number of laminated internal electrodes was 266 in each capacitor. Also, a distance between the mounting portion of the metal frame and the multilayer capacitor disposed on the lower side was 800 μm.

5 and #6 are comparative examples, and #5 is a sample in which first multilayer capacitor were disposed on both upper and lower sides, #6 is a sample in which second multilayer capacitors were disposed on both upper and lower sides, #7 is a sample in which the electronic component illustrated in FIG. 12 was used, and #8 is a sample in which the electronic component illustrated in FIG. 10 was used.

Referring to FIG. 14, it is indicated that acoustic noise was further reduced as compared to #1 to #4 above by including the metal frame.

Among the samples, in #5, the acoustic noise was 30.1 dB, the highest, and in #6, acoustic noise was 29.8 dB, lower than #5 but still high.

In #7 and #8 according to the example embodiment, it is indicated that acoustic noises were 28.1 dB and 28.2 dB, respectively, which were further reduced than in #5 and #6.

In particular, in the structure having the metal frame as described above, the least acoustic noise was observed in #3 in which the first multilayer capacitor having the horizontal lamination structure is disposed on the mounting surface side.

The number of the stacked multilayer capacitors may not be limited to those shown in the drawings. For example, three or more multilayer capacitors may be stacked in the Z direction. In one example, the multilayer capacitor(s) of the horizontal laminating type and the multilayer capacitor(s) of the vertical laminating type may be alternately stacked.

According to the aforementioned example embodiment, in the electronic component including the plurality of multilayer capacitors disposed adjacent to each other, by alternately laminating the multilayer capacitor of the horizontal laminating type and the multilayer capacitor of the vertical laminating type, acoustic noise in the audible frequency range of less than 20 kHz and high frequency vibrations of 20 kHz or higher may be reduced.

While the example embodiments have been illustrated and described above, it will be apparent to those skilled in the art that modifications and variations could be made without departing from the scope in the example embodiment as defined by the appended claims.

What is claimed is:

1. An electronic component, comprising:
at least one first multilayer capacitor and at least one second multilayer capacitor alternatively laminated in a stacking direction perpendicular to one surface of the first multilayer capacitor, such that an external electrode of the first multilayer capacitor is connected to an external electrode of the second multilayer capacitor,
wherein, in the first multilayer capacitor, a plurality of internal electrodes are laminated in a first direction,
wherein, in the second multilayer capacitor, a plurality of internal electrodes are laminated in a second direction perpendicular to the first direction,
wherein a conductive adhesive layer is disposed on opposing end surfaces of the at least one first multilayer capacitor and the at least one second multilayer capacitor and extends to facing surfaces of the at least one first multilayer capacitor and the at least one second multilayer capacitor, so as to overlap in the stacking direction at least one of the plurality of internal electrodes of the at least one first multilayer capacitor or at least one of the plurality of internal electrodes of the at least one second multilayer capacitor, and
wherein the conductive adhesive layer extends in the stacking direction to a level which intersects a plane corresponding to a surface, of at least one of the at least one first multilayer capacitor or the at least one second multilayer capacitor, which opposes a corresponding one of the facing surfaces.

2. The electronic component of claim 1, wherein the first multilayer capacitor is disposed on a lowermost end in the first direction.

3. The electronic component of claim 1, wherein the second multilayer capacitor is disposed on a lowermost end in the first direction.

4. The electronic component of claim 1,
wherein the first multilayer capacitor includes a first body and first and second external electrodes disposed on both ends of the first body in a third direction perpendicular to the second direction, respectively,
wherein the first body includes a plurality of first dielectric layers and first and second internal electrodes alternately disposed in the first direction with the first dielectric layer interposed therebetween,
wherein the second multilayer capacitor includes a second body and third and fourth external electrodes disposed on both ends of the second body in the third direction, respectively, and
wherein the second body includes a plurality of second dielectric layers and third and fourth internal electrodes alternately disposed in the second direction with the second dielectric layer interposed therebetween.

5. The electronic component of claim 4,
wherein the first and second external electrodes include first and second head portions disposed on both end surfaces of the first body in the third direction, respectively, and first and second band portions extending from the first and second head portions to portions of upper and lower surfaces and portions of both side surfaces of the first body, respectively, and wherein the third and fourth external electrodes include third and fourth head portions disposed on both end surfaces of the second body in the third direction, respectively, and third and fourth band portions extending from the third and fourth head portions to portions of upper and lower surfaces of the second body and portions of both side surfaces of the second body, respectively.

6. The electronic component of claim 1, further comprising:
a metal frame connected to the external electrode of the first multilayer capacitor and the external electrode of the second multilayer capacitor and allowing the first or second multilayer capacitor to be spaced apart from a mounting surface.

7. The electronic component of claim 5, further comprising:
a first metal frame including a first vertical portion bonded to the first and third head portions, and a first mounting portion extending in a third direction from a lower end of the first vertical portion; and
a second metal frame including a second vertical portion bonded to the second and fourth head portions, and a second mounting portion extending in the third direction from a lower end of the second vertical portion.

8. The electronic component of claim 7,
wherein the first mounting portion and the second mounting portion are spaced apart from the first multilayer capacitor and the second multilayer capacitor.

9. An electronic component, comprising:
first and second multilayer capacitors laminated side by side with each other in a first direction perpendicular to one surface of the first multilayer capacitor,
wherein the first multilayer capacitor includes first and second internal electrodes alternately laminated in the first direction, and first and second external electrodes disposed on both ends to be connected to the first and second internal electrodes, respectively,
wherein the second multilayer capacitor includes third and fourth internal electrodes alternately laminated in a second direction perpendicular to the first direction, and third and fourth external electrodes disposed on both ends to be connected to the third and fourth internal electrodes, respectively,
wherein the first external electrode is connected to the third external electrode, and the second external electrode is connected to the fourth external electrode,
wherein a conductive adhesive layer is disposed on opposing end surfaces of the first multilayer capacitor and the second multilayer capacitor and extends to facing surfaces of the first multilayer capacitor and the second multilayer capacitor, so as to overlap in the first direction at least one of the first, second, third or fourth internal electrodes, and
wherein the conductive adhesive layer extends in the first direction to a level which intersects a plane corresponding to a surface, of at least one of the first multilayer capacitor or the second multilayer capacitor, which opposes a corresponding one of the facing surfaces.

10. The electronic component of claim 9, wherein the first multilayer capacitor is disposed adjacent to a mounting surface.

11. The electronic component of claim 9, wherein the second multilayer capacitor is disposed adjacent to a mounting surface.

12. An electronic component, comprising:
a plurality of multilayer capacitors stacked on each other in a first direction and including a first multilayer capacitor and a second multilayer capacitor,
wherein internal electrodes of the first multilayer capacitor are laminated in the first direction, and internal electrodes of the second multilayer capacitor are laminated in a second direction different from the first direction,
wherein a conductive adhesive layer is disposed on opposing end surfaces of the first multilayer capacitor and the second multilayer capacitor and extends to facing surfaces of the first multilayer capacitor and the second multilayer capacitor, so as to overlap in the first direction at least one of the internal electrodes of the first multilayer capacitor or at least one of the internal electrodes of the second multilayer capacitor, and
wherein the conductive adhesive layer extends in the first direction to a level which intersects a plane corresponding to a surface, of at least one of the first multilayer capacitor or the second multilayer capacitor, which opposes a corresponding one of the facing surfaces.

13. The electronic component of claim 12,
wherein first and second external electrodes of the first multilayer capacitor are respectively connected to third and fourth external electrodes of the second multilayer capacitor.

14. The electronic component of claim 13, wherein the conductive adhesive layer comprises:
a first conductive adhesive layer disposed between the first external electrode and the third external electrode; and
a second conductive adhesive layer disposed between the second external electrode and the fourth external electrode.

15. The electronic component of claim 13, further comprising:
a first metal frame including a first vertical portion connected to the first external electrode and the third external electrode, and a first mounting portion bent from the first vertical portion; and
a second metal frame including a second vertical portion connected to the second external electrode and the fourth external electrode, and a second mounting portion bent from the second vertical portion.

16. The electronic component of claim 15,
wherein the first mounting portion and the second mounting portion are spaced apart from the first multilayer capacitor and the second multilayer capacitor.

17. The electronic component of claim 16,
wherein the second multilayer capacitor is closer to the first mounting portion and the second mounting portion than the first multilayer capacitor.

18. The electronic component of claim 16,
wherein the first multilayer capacitor is closer to the first mounting portion and the second mounting portion than the second multilayer capacitor.

* * * * *